(12) United States Patent
Tapia et al.

(10) Patent No.: US 8,923,873 B2
(45) Date of Patent: Dec. 30, 2014

(54) DEVICE TRIGGERED CHANNEL SELECTION

(71) Applicant: T-Mobile USA, Inc, Bellevue, WA (US)

(72) Inventors: Pablo Tapia, Snoqualmie, WA (US); Alexandru Catalin Ionescu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 112 days.

(21) Appl. No.: 13/676,039

(22) Filed: Nov. 13, 2012

(65) Prior Publication Data

US 2013/0316716 A1    Nov. 28, 2013

Related U.S. Application Data

(60) Provisional application No. 61/559,680, filed on Nov. 14, 2011.

(51) Int. Cl.
*H04W 72/00* (2009.01)
*H04W 72/04* (2009.01)
*H04W 76/04* (2009.01)

(52) U.S. Cl.
CPC .......... *H04W 72/048* (2013.01); *H04W 76/046* (2013.01)
USPC .......................................... 455/450; 370/328

(58) Field of Classification Search
USPC ............................ 455/450–453; 370/329, 330
See application file for complete search history.

(56) References Cited

U.S. PATENT DOCUMENTS

| | | | |
|---|---|---|---|
| 6,950,399 B1* | 9/2005 | Bushmitch et al. | 370/236 |
| 7,580,388 B2 | 8/2009 | Kim | |
| 8,078,184 B2 | 12/2011 | Farnsworth et al. | |
| 8,094,599 B2 | 1/2012 | Marinier et al. | |
| 2008/0159218 A1 | 7/2008 | Dwarakanath | |
| 2008/0194266 A1* | 8/2008 | Islam et al. | 455/450 |
| 2009/0185527 A1 | 7/2009 | Akhtar et al. | |
| 2009/0191858 A1 | 7/2009 | Calisti et al. | |
| 2009/0231999 A1 | 9/2009 | Verma et al. | |
| 2011/0194437 A1* | 8/2011 | Song et al. | 370/252 |
| 2011/0299485 A1* | 12/2011 | Hannu et al. | 370/329 |
| 2012/0044831 A1 | 2/2012 | Kazmi et al. | |

FOREIGN PATENT DOCUMENTS

EP    2224660 A1    9/2010
WO    WO2009135534 A1    11/2009

OTHER PUBLICATIONS

PCT Search Report and Written Opinion mailed Apr. 1, 2013 for PCT Application No. PCT/US12/64974, 10 pages.

* cited by examiner

*Primary Examiner* — Daniel La
(74) *Attorney, Agent, or Firm* — Lee & Hayes, PLLC

(57) ABSTRACT

A telecommunication device having a network interface module that is operable to detect an action at a network-driven application of the telecommunication device, which uses broadband Internet access to carry out its primary application functions. The network interface module then determines whether the detected action initiates a data transfer request corresponding to an application-specific rule identifying a timing sensitivity of the network-driven application. Then, based on this determination, the network interface module identifies and triggers a transition to a designated radio resource control (RRC) connected mode channel for a data transfer of the network-driven application to another network device, to improve a user's quality of experience (QoE) by reducing latency associated with the data transfer.

23 Claims, 7 Drawing Sheets

400

Timing Sensitivity Levels 408

Level_1 > Level_2 > Level_3

410

Application Data Timing Sensitivity 418

$Data^{Video\ Streamer} > Data^{Online\ Game} > Data^{Web\ Browser}$

DEVICE TRIGGERED CHANNEL SELECTION

CROSS REFERENCE TO RELATED PATENT APPLICATIONS

This patent application claims priority filing benefit from U.S. Provisional Patent Application No. 61/559,680, filed Nov. 14, 2011, which is hereby incorporated by reference, in its entirety.

BACKGROUND

Modern telecommunication systems include heterogeneous mixtures of second, third, and fourth generation (2G, 3G, and 4G) cellular-wireless access technologies, which are cross-compatible and operate collectively to provide broadband communication services to a majority of the population in the United States, as well as to populations abroad. Presently, there are a variety of different telecommunication access technologies that are standardized by the 3rd Generation Partnership Project (3GPP), which is a conglomeration of cooperating telecommunication standards organizations. Radio access technologies recognized by 3GPP are constantly evolving through newer generations of radio communications standards, which are sanctioned by respective 3GPP specification groups.

As would be understood by those skilled in the art, Global Systems for Mobile (GSM) is synonymous with 2G telecommunications technologies; Universal Mobile Telecommunications System (UMTS) has become synonymous with 3G telecommunications technologies; and Long Term Evolution (LTE), including LTE Advanced, has become synonymous with 4G telecommunications technologies. UMTS is recognized in the industry as one or the largest, deployed access technologies, and it includes both Wideband Code Division Multiple Access (W-CDMA) and High-Speed Packet Access (HSPA). Further, HSPA encompasses Evolved High-Speed Packet Access (HSPA+) and High-Speed Data Packet Access (HSDPA) technologies.

In UMTS, the Radio Resource Control (RRC) protocol is associated with the W-CDMA protocol stack and it is generally configured to handle control plane signaling between User Equipment (UEs) and the Universal Terrestrial Radio Access Network (UTRAN). The UTRAN includes combinations of NodeBs, which are UMTS base stations, and Radio Network Controllers (RNCs), which control processes for a group of corresponding NodeBs. The RRC protocol is responsible for connection establishment and release, radio bearer establishment and release, power control, etc within the UTRAN. As would be understood by those skilled in the art, Evolved Universal Terrestrial Radio Access (E-UTRA) is newer air interface associated with LTE, which also includes an RRC layer within its protocol stack. The E-UTRAN includes combinations of Enhanced NodeBs (E-NodeBs), which are LTE base stations that can operate independent of a controlling entity having functionality similar to a UTRAN RNC.

The RRC protocol generally consists of an RRC idle mode, as well as multiple RRC connected modes, regardless of whether the RRC protocol is associated with the UTRA air interface of UMTS, or the E-UTRA air interface of LTE. By way of example, the RRC connected modes for UMTS include the following transport channel types: paging channels (PCHs), a forward access channel FACH, and a dedicated channel (DCH). Backward transitions between pairs of connected mode channel states can be triggered by RRC inactivity timers, whereas forward transitions between pairs of connected mode channel states can be triggered by a service provider designated transport channel data threshold, which when exceeded, affects a corresponding RRC connected mode channel state transition to a more robust connected mode channel for facilitating a corresponding data transfer.

Within the context of the backwards transitions between the different RRC connected mode channel states, a T1 timer expiration event can trigger a state transition from Cell_DCH to Cell_FACH, a T2 timer expiration event may trigger a state transition from Cell_FACH to Cell_PCH, and a T3 imer expiration event can trigger a state transition from Cell_PCH back to an Idle Mode. With respect to the forward RRC connected mode channel state transitions, access providers generally allocate how much data is allowed to be communicated for a corresponding RRC channel by designating a provider-specific data transfer threshold for automatically triggering an RRC state transition from Cell_FACH to Cell_DCH. It should be understood that there is generally only one RRC connection open to a UE at a time; meaning, that only one RRC connected mode channel (e.g., a PCH, a FACH, or a DCH) can be employed at a UE at any given instance during a corresponding data transfer session, or during corresponding data control signaling.

Further, high-speed downlink shared channels (HS-DSCHs) for most downlink data transfers may only be available to a UE during the Cell_DCH state, which consumes significantly more power than that of other RRC connected mode channel states, but advantageously provides much greater throughput over a corresponding DCH. In contrast, access provider communications with the UE generally take place in other RRC connected mode states, such as during Cell_FACH, Cell_PCH, or URA_PCH, states. As would be understood by those skilled in the art, data transfers over a FACH can be limited to relatively low data rate values, due to the RNC's inability to adaptively set or modify its transmission power, as well as its assigned modulation and coding scheme for FACH. These data rate limitations can result in lengthy call setup times as well as delayed RRC state transitions between the Cell_FACH and the Cell_DCH.

As such, it is generally well known that RRC connected mode transport channel state transitions are set by a corresponding telecommunication service provider without consideration for data-type sensitivity, dynamic network resource availability, or time-varying device resource availability. Accordingly, there is an opportunity for cellular access providers to improve upon existing RRC transport channel state transition processes, by considering how to better determine and affect RRC state transitions in real-time, to improve its customers' quality of experience (QoE), in accordance with their respective Service Level Agreements (SLAs). Additionally, there is also an opportunity for improving upon a cellular access provider's cumulative quality of service (QoS) by considering ways to reduce a number of redundant or unnecessary RRC transport channel state transitions.

BRIEF DESCRIPTION OF THE DRAWINGS

The Detailed Description is set forth with reference to the accompanying figures.

DETAILED DESCRIPTION

Today, telecommunication service providers furnish their customers with an array of proprietary communication devices that can be utilized by an end user to gain access to the provider's telecommunication network, for the primary purposes of sending and receiving digital voice and internet protocol (IP) communications. However, the vast majority of data being communicated over modern telecommunication networks is IP data that emanates from a select group of prominent web-based content providers, including, but not limited to: Facebook®, Twitter®, Netflix®, Hulu®, YouTube®, Pandora®, iTunes®, Google Play®, Amazon Store®, and the like. Consequently, there is a pervading need for network service providers to employ dynamic mechanisms to improve their respective users' quality of experience (QoE), as these users access services of, and acquire media content from, these popular web-based content providers.

Figure 1:
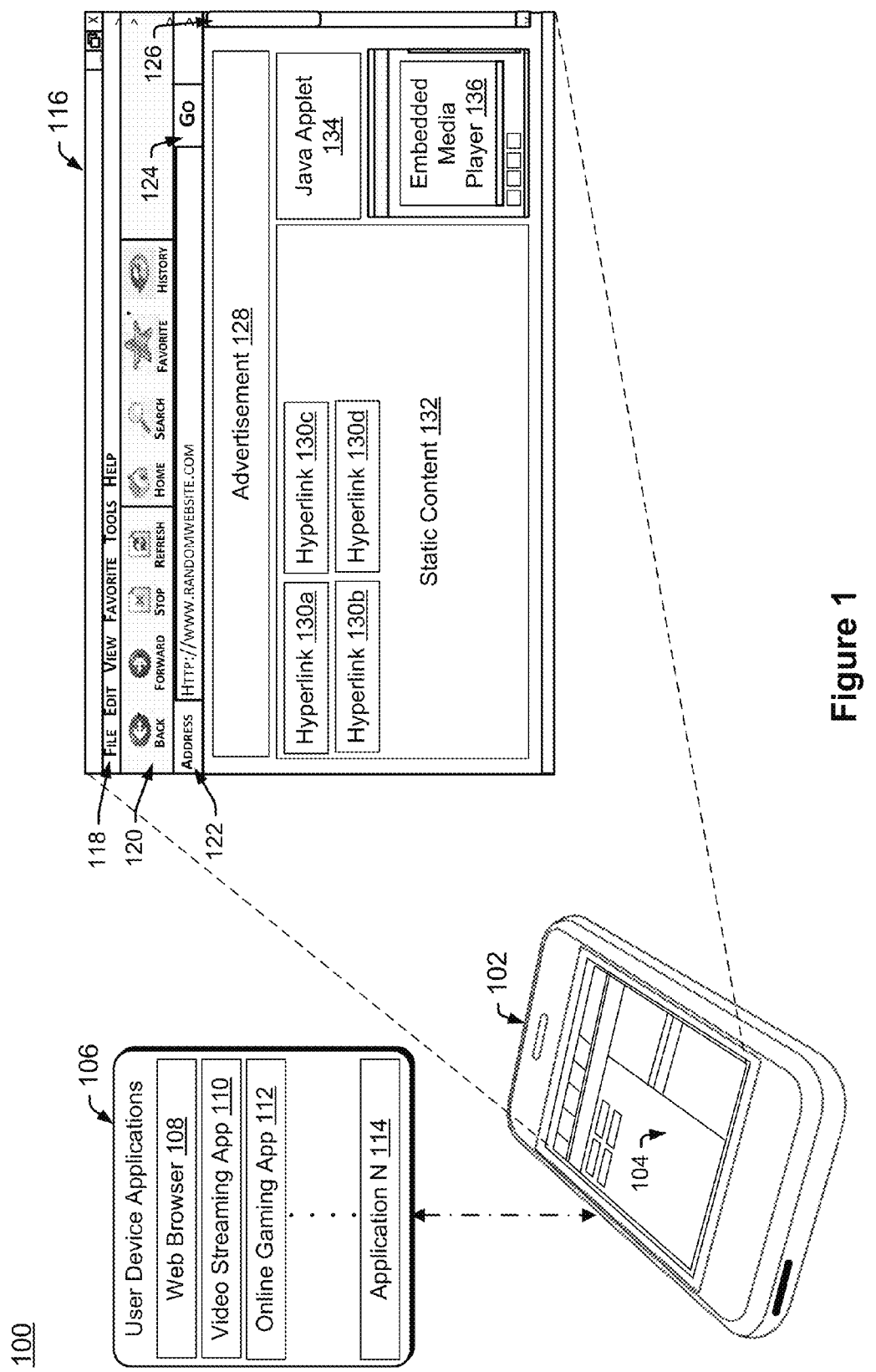
FIG. 1 is diagram illustrating a user device configured to trigger radio resource control (RRC) protocol transport channel state transitions, based on application-specific data timing sensitivities, in accordance with embodiments of the disclosure.

In accordance with various implementations of the disclosure, FIG. 1 depicts a telecommunication platform 100, including a user device 102 that is configured to trigger/initiate radio resource control (RRC) protocol connected mode state transitions, on a per-application basis. As will be described further herein, these RRC state transitions may be based on, or correlated to, various data timing sensitivities that are intrinsic to each particular application 106 of the user device 102. It should be understood that the RRC protocols described herein can relate to either a protocol associated with the Universal Terrestrial Radio Access (UTRA) air interface, or a protocol associated with the Evolved Universal Terrestrial Radio Access (E-UTRA) air interface. Further, the applications 106 stored at the user device 102, can correspond to network-driven applications that use broadband Internet access for providing dynamic web-based content to the user device 102, as well as to device-driven applications that do not use broadband Internet access to achieve their primary purpose.

In an embodiment, the applications 106 stored at the user device 102 may include, but are not limited: to a web browser application 108, a video streaming application 110, an online gaming application 112, and so on, through an Nth software application 114. It should be understood that user device applications 106 that are not associated with time-sensitive data are deemed to be device-driven applications, which are not considered in the channel state transition processes of the disclosure. In contrast, user device applications 106 that are associated with time-sensitive data (e.g., device applications having a variety of different levels of data timing sensitivities) are deemed to be network-driven applications, and these dynamic applications are integral to the connected mode RRC channel state transition processes described herein. By way of example, each of the web browser 108, the video streaming application 110, and the online gaming application 112, relate to distinct types of network-driven applications that use varying levels broadband Internet access to respectively retrieve website content, stream video and/or audio content, and enable bursty online gaming sessions.

In FIG. 1, the web browser 108 application is depicted on the display portion 104 of the user device 102 and as an exploded view of the web browser application's interface 116, which portrays a random website that is identified in a URL address component 122 of the browser interface 116, in accordance with the domain naming system (DNS). As would be understood by those skilled in the art, after a web browser application 108 is launched at the user device 102, the browser may be configured to automatically retrieve Internet content associated with a default home page stored on a web server in associations with a particular IP-address location, or alternatively, to open and await a user action that initiates a web-query and/or a data transfer request. In one implementation, a user can initiate a web query by simply entering a website domain name into the URL address component 122 of the browser 116 interface and then selecting the browser's "Go" button 124. Accordingly, a single user action of either launching the browser application interface 116, or manually selecting a particular browser function, can result in a corresponding data transfer request being communicated from the web browser application 108 to a corresponding host web server storing the requested web-based content. In an embodiment, the transfer request can be communicated via a portion of a telecommunications network allocated to a serving wireless access provider.

In an implementation, the interface 116 of the browser application 108 can include, but is not limited to, a browser drop-down menu toolbar 118 having multiple selectable options for performing various browser control/management actions, a browser search toolbar 120 having various selectable buttons, links, and/or functions for performing common browsing actions, a URL address component 122 for displaying and enabling data entry of a specified website's URL address, a browser "Go" button 124 for launching a URL-based web query, and a browser scroll bar 126 that facilitates a user being able to view selectable portions of a displayed website on the display 104 of their user device 102, in a viewing area of the browser interface 116.

A website displayed at the browser interface 116 can consist of a variety of different static and dynamic webpage content. In one embodiment, the webpage content may include an advertisement component 128, such as a dynamic banner with advertisement graphics, a static content component 132 having a combination of textual and image content including hyperlinks 130a-d that link to various websites webpages and/or web-based media content, a Java® applet component 134 associated with an lightweight integrated software application that is run at the browser interface 116 using a Java Virtual Machine (JVM) of the Java Runtime Environment (JRE), and an embedded media player component 136 which may be enabled by an associated browser plug-in that supports vector and raster graphics, as well as playback of streaming of video and audio.

In various implementations, the user device 102 may be representative of a cellular telephone, a portable digital assistant (PDA), a tablet computer, an electronic book device, a handheld gaming unit, a personal media player device, or the like. The user device 102 can be configured to communicate over a telecommunication network using any common wireless and/or wireline network access technology. Further, the user device 102 may be configured to run any compatible device operating system (OS), including but not limited to, Microsoft Windows Mobile®, Google Android®, Apple iOS®, Linux Mobile®, as well as any other common mobile device OS.

Figure 2:
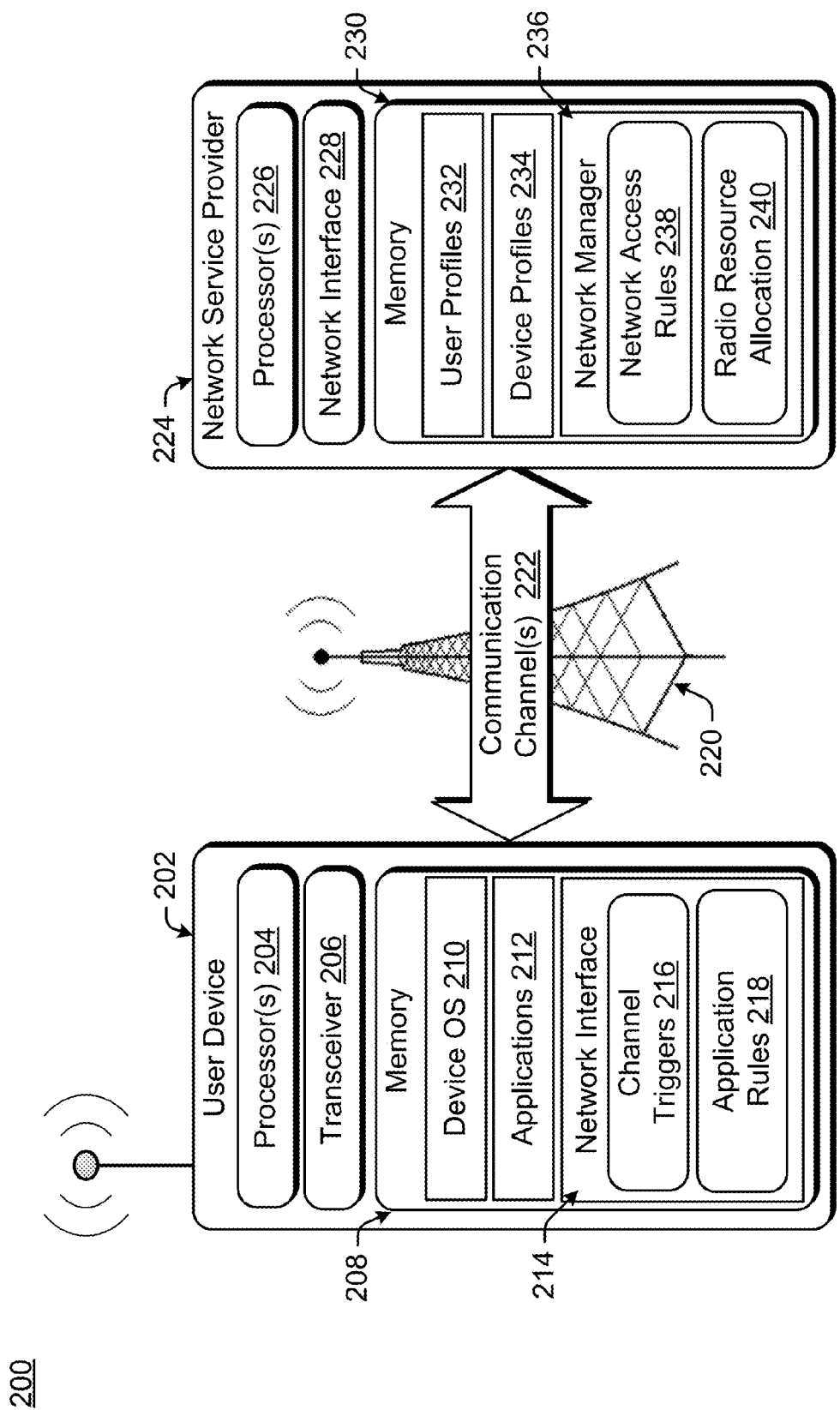
FIG. 2 is an example network hardware platform employed in a RRC transport channel allocation scheme for identifying and selecting a designated communication channel for a user device, in accordance with embodiments of the disclosure.

FIG. 2 depicts a multi-device hardware platform 200 employed in an RRC transport channel allocation scheme that can identify, and transition to, a designated RRC connected mode channel for a particular user device 202 that is in communication with a network service provider entity 224. It should be understood that the user device 202 of FIG. 2 may be representative of the communication device 102 of FIG. 1, which is described above as being any one of a number of common mobile user device types. In various implementations, the network service provider entity 224 may be representative of one or more of, a NodeB, a radio network controller (RNC), a gateway GPRS support node (GGSN), a serving GPRS support node (SGSN), and/or a mobile switching center (MSC), for UMTS, as well as one or more of an enhanced NodeB (E-NodeB), a mobility management entity (MME), a serving gateway (SGW), a PDN gateway (PGW), and/or an evolved packet data gateway (e-PDG), for LTE.

It should also be appreciated that the multi-device hardware platform 200 could be configured to employ any combination of common wireless broadband communication technologies, including, but not limited to, LTE, LTE Advanced, HSDPA/HSPA+, UMTS, CDMA, GSM, WiMax, and WiFi. Further, a backhaul portion of a corresponding telecommunication network for the hardware platform 200 may be configured to employ any common wireline communication technology, including but not limited to, optical fiber, coaxial cable, twisted pair cable, Ethernet cable, and powerline cable, along with any common wireless communication technology.

In an embodiment, the user device 202 may include, but is not limited to, one or more processor(s) 204, a radio transceiver 206 for communicating over a telecommunication network using different types of allocated RRC connected mode channels 222 (e.g., a PCH, a FACH or a DCH), and a memory 208 storing a device OS 210, various software applications 212 (including any of the network-driven applications 108, 110, 112, 114 depicted in FIG. 1), as well as a network interface module 214 associated with a variety of channel triggers 216 and application rules 218.

Although not explicitly depicted in FIG. 2, each of the one or more processor(s) 204, can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 204 may be configured to execute each of the software applications 212 stored in the user device's 202 memory 208, which may be associated with any common type of volatile memory, such as a random access memory (RAM), and/or any common type of non-volatile memory, such as a read-only memory (ROM).

In various implementations, the network interface module 214 may be configured to detect an action at an application 212 of the user device 202, and then trigger/initiate one or more RRC transport channel selection 216 processes, based on a comparison of a data transfer request to one or more corresponding application rules 218. In an exemplary embodiment, a channels trigger 216 may correspond to a communicated data transfer request, having additional or supplemental data appended thereto. The additional or supplemental data may correspond to either appended dummy data or "piggybacked," e.g., buffered, application-specific data, which would not ordinarily be considered to be a part of an original data transfer request. The network service provider entity 224 may be further configured to receive a data transfer request from the user device 202 and then compare the received request information to a proprietary RRC data threshold to determine if a corresponding channel state transition is indicated by the proprietary RRC threshold having been exceeded.

In an implementation, the user device 202 can acquire knowledge of the proprietary RRC data threshold of a corresponding network service provider entity 224 by requesting this information directly, or by the network service provider entity 224 periodically provisioning the user device 202 with this information. However in other embodiments, the user device 202 may dynamically determine the proprietary RRC data threshold, independent from a specific indication of for this information from a service provider. By way of example, the user device 202 may initially determine a designated RRC connected mode transport channel (e.g., a FACH or a DCH) allocated to it by a corresponding service provider entity 224. Next, the user device 202 can transmit different specified quantities of supplemental data (e.g., dummy data) in a series of data transmissions to the network service provider entity 224, until a corresponding transport channel state transition is detected (e.g., a transition from a Cell_FACH to a Cell_DCH), at the user device 202.

In this scenario, it should be understood that iterative data transfers of progressive supplemental data (dummy data transfers having increasing size), would cause the transport channel state transition, when a breach of the proprietary RRC data threshold is detected at the network service provider entity 224, i.e., where the data RRC data threshold is exceeded by a specific data quantity of one of the supplemental data transfers. In this scenario, the user device can readily determine a specific quantity of supplemental data which caused the transport channel state transition at the network service provider entity 224. Alternatively stated, the user device 202 can iteratively determine a provider-specific buffer size associated with corresponding RRC connected mode channel states (e.g., by determining a Cell_FACH buffer size associated with a proprietary RRC data threshold for a forward channel state transition between Cell_FACH and Cell_DCH).

Subsequently, the user device 202 can set its corresponding, locally-stored (e.g., in memory 208) transport channel state transition threshold, based on a specific quantity of supplemental data causing the RRC channel state transition, i.e., a quantity exceeding the corresponding proprietary RRC data threshold. In an embodiment, the RRC channel state transition may relate to a transition between a pair of RRC connected mode channel states that are associated with either one of the UTRA air interface or the E-UTRA air interface. In an embodiment, the transport channel state transition threshold that is set at the user device 202 can be substantially equivalent (e.g., having only a minor quantity variance caused by measurement error) to the corresponding proprietary RRC data threshold set by the network service provider entity 224.

In various implementations, when a proprietary RRC data threshold is determined to have been exceeded, the network service provider entity 224 may coordinate with the user device 202 to allocate a different designated RRC connected mode channel, e.g., a DCH, for a corresponding data transfer. In an implementation, an action that may initiate the data transfer request to the network service provider entity 224 may be associated with a launch of the web browser application 108, or a selection to acquire supplemental web content by browsing to a particular webpage of a website 122 or by clicking on a linked webpage content of an already displayed webpage, such as the advertisement 128, hyperlinks 130a-d, Java applet 134, or embedded media player 136 components of the browser interface 116.

In an embodiment, the application rules 218 of the network interface module 214 may correspond to application-specific criteria that identify data type sensitivity levels for data associated with particular network-driven applications 212 that are stored in the memory 208 of the user device 202. In one implementation, different application rules 218 can be assigned for different applications 212 of the user device 202, based on a determined data-type sensitivity level of a particular application. In an embodiment, an identification of a corresponding application rule 218 for a data transfer of a particular application 106 of the user device 202 can facilitate a determination, at the user device's 202, as to whether to trigger/initiate various RRC channel state selections 216.

In an implementation, a network service provider entity 224 of an affiliated telecommunication service provider may include, but is not limited to, one or more processor(s) 226, a network interface 228 for enabling the service provider entity 224 to communicate with the user device 202 using an allocated RRC connected mode channels 222 (e.g., a PCH, a FACH or a DCH), and a memory 230 storing user/subscriber profiles 232, proprietary device profiles 234, and a network manager 236, having a network access rules component 238 and a radio resource allocation component 240. In a scenario where the network service provider entity 224 is not a network base station, such a NodeB or an E-NodeB, the network service provider entity 224 may communicate with the user device 202 via a distributed network base station 220 that is distinct from the network service provider entity 224.

Each of the one or more processor(s) 226 of the network service provider entity 224 may include one or more CPUs having multiple ALUs that perform arithmetic and logical operations, as well as one or more CUs that extract instructions and content from processor cache memory, and then executes the instructions by calling on the ALUs, as necessary, during program execution. The processor(s) 226 may further be configured to execute the network manager 236 stored in the memory 230 of the network service provider entity 224, which may be associated with any common type of volatile memory, such as a random access memory (RAM), and/or any common type of non-volatile memory, such as a read-only memory (ROM).

In an implementation, the device profiles 232 may correspond to data associated with proprietary user devices 202 that are sold by a particular telecommunication service provider, and the user profiles 234 may correspond to user data associated with individual subscriber accounts of a telecommunication service provider. In various embodiments, the network manager 236 may be responsible for controlling a portion of a telecommunication network by allocating corresponding network resources to its customers and either granting or denying access to its proprietary network services. In an implementation, the network access rules component 238 may be configured to determine whether a user device 202 is allowed access to various services of a telecommunication service provider, after receiving a corresponding access request from the user device 202, including various identification information that the network access rules component 238 can cross-reference to corresponding user 232 and device 234 profiles stored in the memory 230 of the network service provider entity 224.

In an embodiment, the radio resources allocation component 240 may be configured to receive a data transfer request from a user device 202 that has been authenticated via the network access rules component 238. As described above, the data transfer request may include additional or supplemental data, and the network service provider entity's 224 radio resource allocation component 240 can compare the supplemented data transfer request to a corresponding proprietary RRC data threshold to determine whether and/or when to transition between a current RRC channel state and a different RRC channel state (e.g., by transitioning from a Cell_FACH state to a Cell_DCH state), such as when the proprietary RRC data threshold is determined to have been exceeded during the above-mentioned data quantity threshold comparison. In various implementations, the additional or supplemental data, e.g., dummy data or buffered data, may be appended to a data transfer request at the user device 202 for the intended purpose of exceeding the proprietary RRC data threshold. Further, different channel triggers 216 may be employed at the user device 202 in accordance with various predefined application-specific rules 218 that are associated with various known application 212 data type sensitivity levels.

Figure 3:
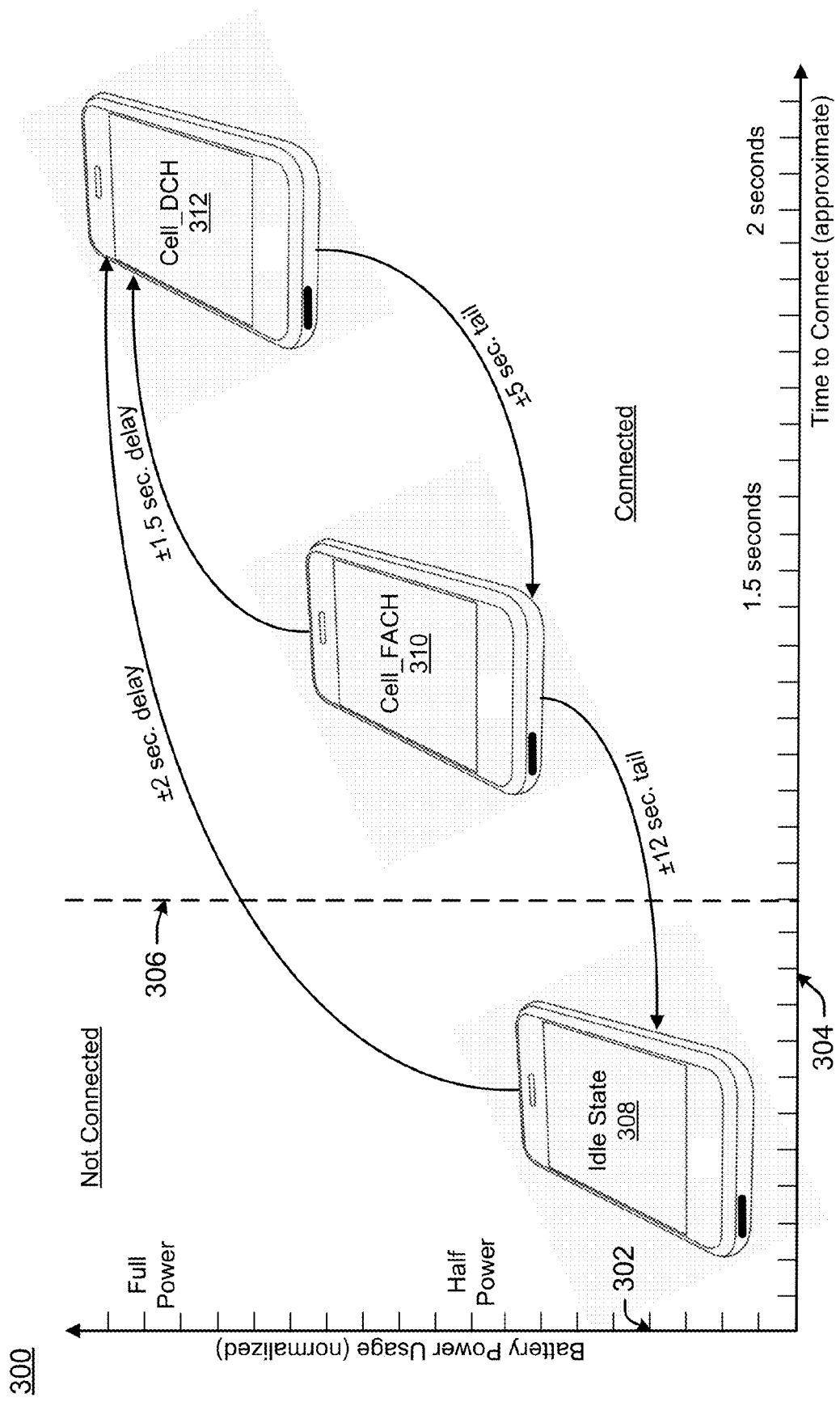
FIG. 3 is a graphical representation depicting both forward and backward RRC transport channel state transition characteristics for a user device, in accordance with embodiments of the disclosure.

FIG. 3 is a graphical representation 300 depicting both forward and backward RRC channel state transition characteristics, e.g., related to requisite RRC power level consumption and forward RRC state transition times, for a user device 202 communicating with a network service provider entity 224 over the UTRA air interface, in accordance with various implementations of the disclosure. The vertical axis 302 of the graphical representation 300 indicates a normalized battery power usage/consumption of user device 202 during various RRC states. The horizontal axis 304 of the graphical representation 300 indicates approximate connection times for the user device 202, which are associated with select forward RRC state transitions. In an embodiment, a user device may be in a low-power RRC Idle state 308 that is associated with a "not connected" mode and is graphically separated from an RRC "connected" mode via the horizontal a dotted line 306 depicted in FIG. 3.

In an implementation, a user device 202 in the low-power RRC Idle state 308 may be instructed to make a forward transition to the full-power RRC connected mode Cell_DCH state 312, a process which may include a ±2 second delay. In another embodiment, a user device 202 in a half-power RRC connected mode Cell_FACH state 310 can be instructed to make a forward transition to the full-power RRC connected mode Cell_DCH state 312, a process which may include a ±1.5 second delay. Accordingly, it should be understood that when an action is detected at a user device 202, which is a determined to be associated with a time-sensitive data transfer request, it may be desirable to immediately transition to a full-power Cell_DCH state 312. In various implementations, such an immediate transition would be preferred, as opposed to first transitioning to a half-power Cell_FACH state 310, and then shortly thereafter transferring to the full-power Cell_DCH state 312, e.g., upon a determination at the network manager 236 that one or more succeeding, related data transfer requests cause a corresponding proprietary RRC data threshold of a network service provider entity 224 to be exceeded. In various implementations, the state transition instructions may emanate from the user device's 202 network interface module 214, the network service provider entity's 224 network manager 236, or any combination thereof.

In an embodiment, a backwards state transition from a Cell_DCH state 312 to a Cell_FACH state 310 may be triggered by a timer expiration event which could be associated with a tail time of approximately ±5 seconds. Further, a backwards state transition from a Cell_FACH state 310 to an Idle state 308 may be triggered by a timer expiration event having a tail time of approximately ±12 seconds. As would be understood by those skilled in the art, by modifying these backward state transition timers, a network service provider can maintain RRC states for desired periods of time to improve a user's quality of experience (QoE) for data transfers or to reduce a user device's battery power consumption.

In accordance with various embodiments, it may be desirable for a user device 202 and/or a network service provider entity 224 to keep/maintain a particular RRC connected mode channel in the connected state for a user device 202, running a particular network-driven application 106. In one implementation, the user device can be configured to periodically send supplemental data (e.g., dummy data) to a corresponding service provider entity 224, to prevent an unwanted backward RRC state transition (e.g., to prevent a detrimental state transition from Cell_DCH to Cell_FACH) that may otherwise occur with the expiration of designated RRC state timer (e.g., any of timers T1, T2, or T3, discussed above in the background). In this manner, a user device 224 can independently keep a designated RRC channel allocated by its network service provider. Accordingly, it should be understood that this RRC channel-locking ability enables a user device 102 having time-delay sensitive software applications 106, to stay connected to more robust transport channels than the user device 202 would otherwise be allowed to remain connected to, for the purpose being able to immediately send and/or receive data over a more robust RRC transport channel type, such as a DCH. In an implementation, this device-side RRC channel-locking mechanism may be set for a select period of time in association with the data-type sensitivity level of a specific software application.

Figure 4A:
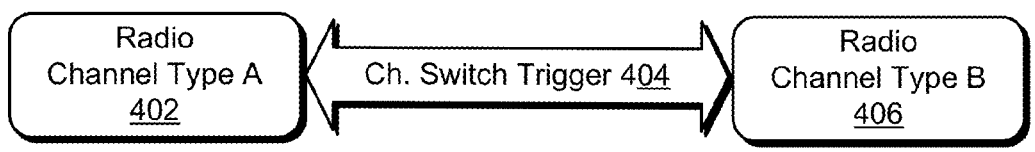
FIGS. 4A-B are graphical representations that depict channel state transitions triggered by various data timing sensitivity rules that are associated with different types of network-driven applications resident at a user device, in accordance with embodiments of the disclosure.

FIG. 4A depicts a graphical representation of a channel state transition 400 between two distinct radio channel types, 402 and 406, which may be associated with RRC channels of either a UTRA air interface or an E-UTRA air interface. In an implementation, a channel switch trigger 404 may be employed to transition a channel state from a Radio Channel Type A 402 to a Radio Channel Type B 406, in accordance with various timing sensitivity levels 408. As depicted in the sensitivity level diagram 408, the timing sensitivity of Level1 is higher/greater than that of Level2, and the timing sensitivity of Level2 is higher/greater than that of Level3. In various embodiments, the timing sensitivity metrics discussed above may be associated with a designated data type of a corresponding data transfer request emanating from a particular network-driven application 106.

Figure 4B:
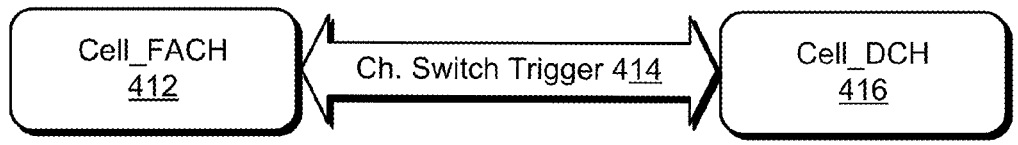

FIG. 4B depicts a graphical representation of an RRC connected mode forward state transition 410 between a Cell_FACH 412 and a Cell_DCH 416, associated with the UTRA air interface. In an embodiment, a channel switch trigger 414 may be employed to initiate the corresponding RRC state transition from Cell_FACH to Cell_DCH, in accordance with the channel triggers 216 and the application rules 218 described above, with respect to at least FIG. 2. In various implementations, an RRC forward state transition may be enabled in accordance with various application data timing sensitivity levels 418 that are respectively associated with the application-specific timing sensitivity rules for a particular network driven application. It should be understood that these application-specific rules 218 are merely exemplary in nature, and as such it should be understood that many types and/or combinations of application data-type sensitivity rules can exist for different network-driven applications stored in the memory 206 of a user device 202, in addition to those that are described herein.

As depicted in the application data timing sensitivity diagram 418, the data timing sensitivity of video streaming data is higher/greater than that of online gaming data, and the data timing sensitivity of online gaming data is higher/greater than that of web browser data. Accordingly, the application-specific rules 218 for each of the video streamer 110, online gaming 112, and web browser 108 applications may be set in accordance with their respective data timing sensitivity. In various embodiments, the application-specific timing sensitivity rules 218, discussed herein, may be associated with designated data types for corresponding data transfer requests emanating from a network-driven application 106. It should be understood that the term "sensitivity," as used herein, refers to a quantifier of a data type volatility for an intended purpose.

By way of example, a network-driven application of a user device 202 may be a video streaming application, such as NetFlix® or Hulu®, which uses continuous, reliable buffering of audio-video data over an IP-based communication channel, to ensure adequate playback of the audio-video data, in terms of a providing a desired user QoE. In this scenario, the application-specific rule(s) of the video streamer 110 would be designated as in accordance with a high/volatile sensitivity (e.g., in terms of an amount of data required for storage in a buffer or cache memory), because it is known in advance that video streamer data transfers are typically associated with substantially large data transfers that cannot be adequately supported by a FACH. As such, a corresponding video streamer application rule 218 stored at the user device 202 be employed to initiate an RRC channel transition from a FACH to a DCH, upon a detected action of merely launching the video streamer application 110 at a user device 202, in accordance with the corresponding video streamer application rule 218.

In an implementation, a corresponding channel triggering event 216 may be initiated at a user device 206, in accordance with a corresponding application rule 218, associated with the video streamer application 110. As discussed above, the channel trigger 216 can initiate a padding of dummy data to a corresponding data transfer request, or alternatively, it can initiate a piggybacking of buffered request data to the data transfer request, which would not have otherwise been added to an original data transfer request. In an embodiment, a corresponding padded or piggybacked data transfer request may be evaluated at the network manager 236 to determine if a proprietary RRC data threshold has been exceeded. This determination can be made by comparing the data transfer request having the additional or supplemental content to a proprietary RRC connected mode data threshold, to identify whether the RRC data threshold has been exceeded. In a scenario where the RRC connected mode data threshold has been exceeded by a modified (e.g., via padding with dummy data or piggybacking with buffered data) data transfer request, the radio resource allocation component 240 of the network manager 236 can allocate a more robust RRC channel, such as DCH, to the user device 202 in order to facilitate a more reliable streaming of audio-video data for play back at the display 104 of the user device 102, during an execution of the video streamer application 110.

Figure 5:
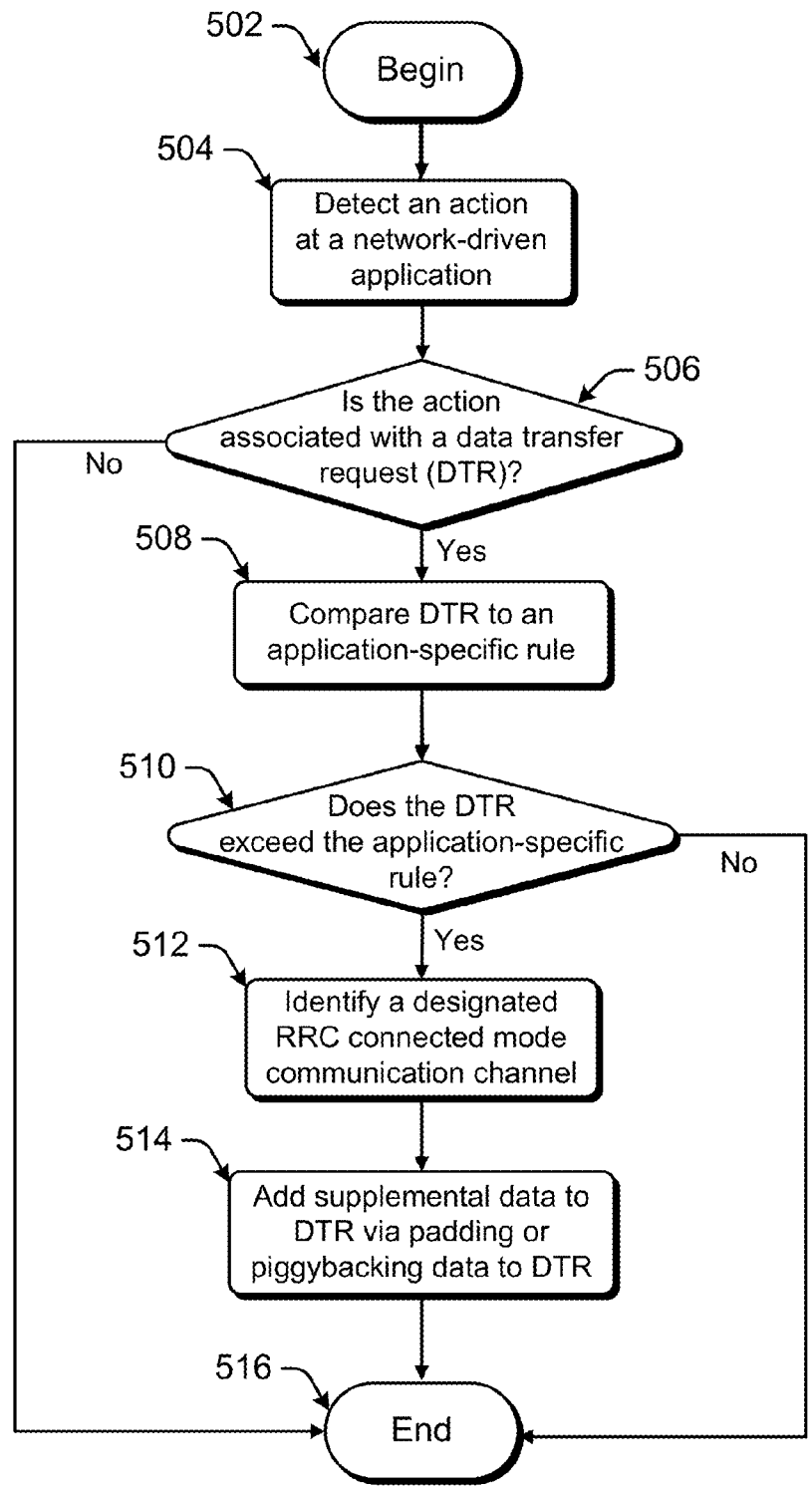
FIG. 5 is a flow chart of an example process for detecting an action associated with a data transfer request at a user device, and a corresponding identification of a designated transport channel for the data transfer, in accordance with embodiments of the disclosure.

FIG. 5 depicts flow diagram procedure 500 associated with a detection of action associated with a data transfer request at a user device 102 and a corresponding identification of a designated connected mode communication channel for the data transfer, in accordance with various implementations of the disclosure. The procedure begins at block 502, which may occur in accordance with any of the above processes described above with respect to FIGS. 1, 2, and 4. For example, a single user action of either launching a browser application interface 116, or manually selecting a particular browser function, can result in an initiation of a corresponding data transfer. At block 504, an action is detected a network-driven application, e.g., at any of the web browser 108, video streamer 110, and online gaming 112 applications, of a user device 102. Subsequently, at decision block 504, it is determined whether the detected action corresponds to a data transfer request that is associated with a request for time-sensitive application data affiliated with the particular network-driven application. If it is determined that the detected action does not correspond to time-sensitive data of a particular network-driven application at decision block 504, the process ends at block 516.

Alternatively, when it is determined that the detected action does in fact correspond to time-sensitive data of a particular network-driven application at decision block 504, the process proceeds to block 508 where the data transfer request is compared to an application-specific rule 218 that can be stored in the memory 208 of the user device 202. Next, at decision block 510, it is determined whether the data transfer corresponds to the application-specific rule 218, based on the comparison at block 508. In accordance with various embodiments, the corresponding rule 218 may be associated with an application data timing sensitivity level for a particular data type of a network-driven application, such as audio-video data, online gaming data, or dynamic web browser data.

If it is determined that data transfer request does not correspond to an application-specific rule 218, then the detected data transfer request data is determined not correspond to time-sensitive data of a particular network-driven application at decision block 510, and the process again ends at block 516. Alternatively, when it is determined that data transfer request does in fact correspond to an application-specific rule 218, then the detected data transfer request data is determined to be associated with time-sensitive data of a particular network-driven application at decision block 510, and the process proceeds to block 512. At block 512, a designated RRC connected mode communication channel is identified based on a corresponding application rule 218 having been identified. Then at block 514, additional or supplemental data is added to the data transfer request by either padding supplemental data to the data transfer request or piggybacking the additional data to the transfer request. Subsequently, the process ends at block 516.

Figure 6:
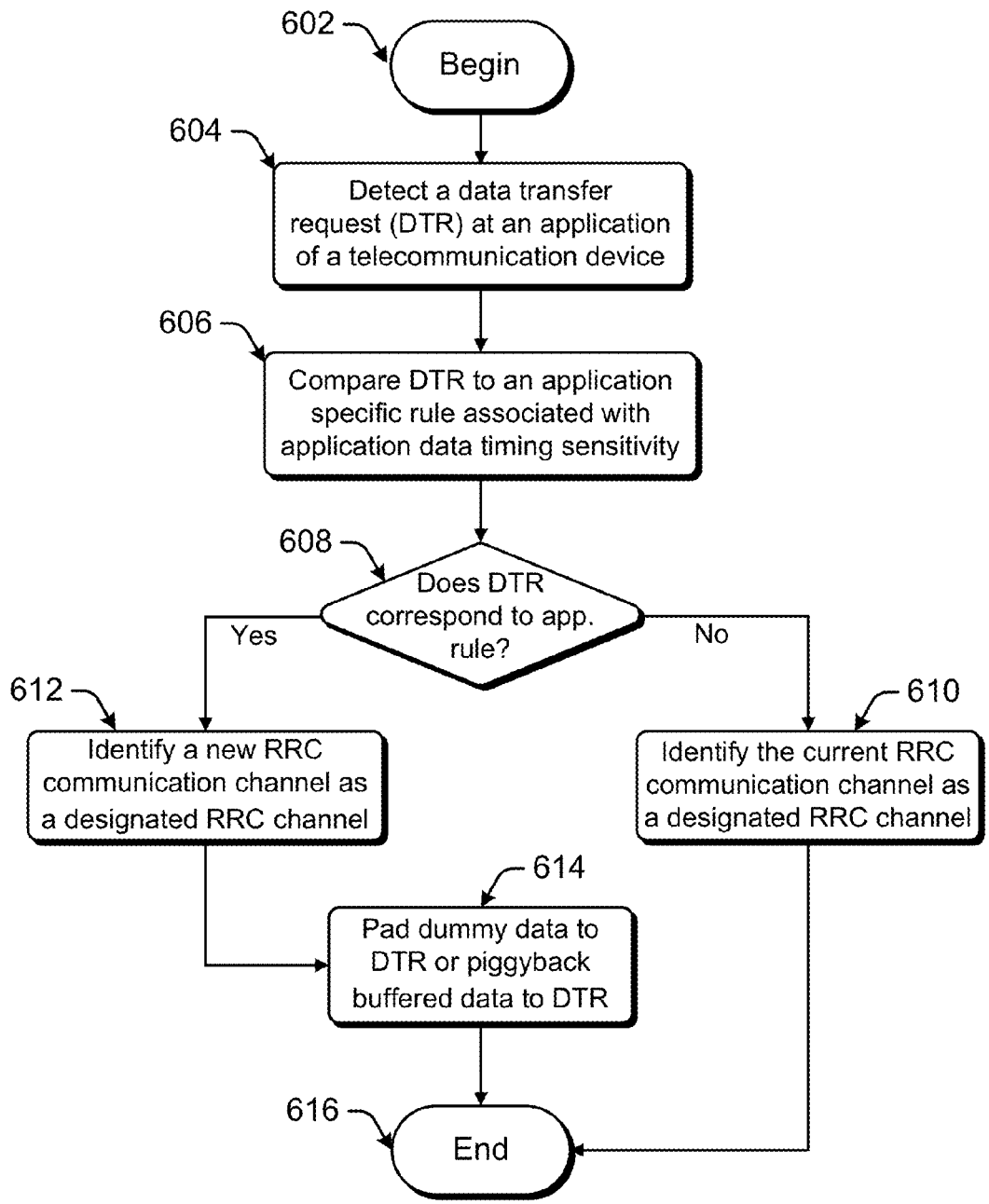
FIG. 6 is a flow chart of an example process for detecting a data transfer request at an application of a telecommunication device, identifying a designated transport channel for the data transfer, and optionally modifying the transfer request based on the identified channel, in accordance with embodiments of the disclosure.

FIG. 6 depicts flow diagram procedure 600 associated with processes for detecting a data transfer request at an application of a telecommunication device, identifying a designated RRC communication channel for the data transfer, and then modifying the transfer request accordingly, in accordance with various implementations. The procedure begins at block 602, which may occur in accordance with any of the above processes described above with respect to FIGS. 1, 2, and 4. At block 604, data transfer request is detected at an application of a telecommunications device, e.g., at any of the web browser 108, video streamer 110, and online gaming 112 applications, of a user device 102. Next, at block 606, the detected data transfer request is compared to an application-specific rule 218 that is associated with a corresponding application data timing particular sensitivity.

Subsequently, at decision block 608, it is determined whether the data transfer request is associated with the application-specific rule 218 of a network-driven application, in accordance with a data-type sensitivity level of the corresponding application. If it is determined that the data transfer request does not correspond to the application-specific rule 218 of the network-driven application at decision block 608, then the process proceeds to block 610, where a current RRC communication channel is identified as a designated communication channel. Subsequently, the process ends at block 615.

Alternatively, when it is determined that the data transfer request does in fact correspond to the application-specific rule 218 of the network-driven application, at decision block 608, then the process proceeds to block 612, where a new RRC communication channel is determined to be the designated communication channel for the telecommunication device. Next, the process proceeds to block 614, where the data transfer request is either padded with dummy data or where buffered data is piggybacked to the data transfer request, as discussed above. Subsequently, the process ends at block 616.

Figure 7:
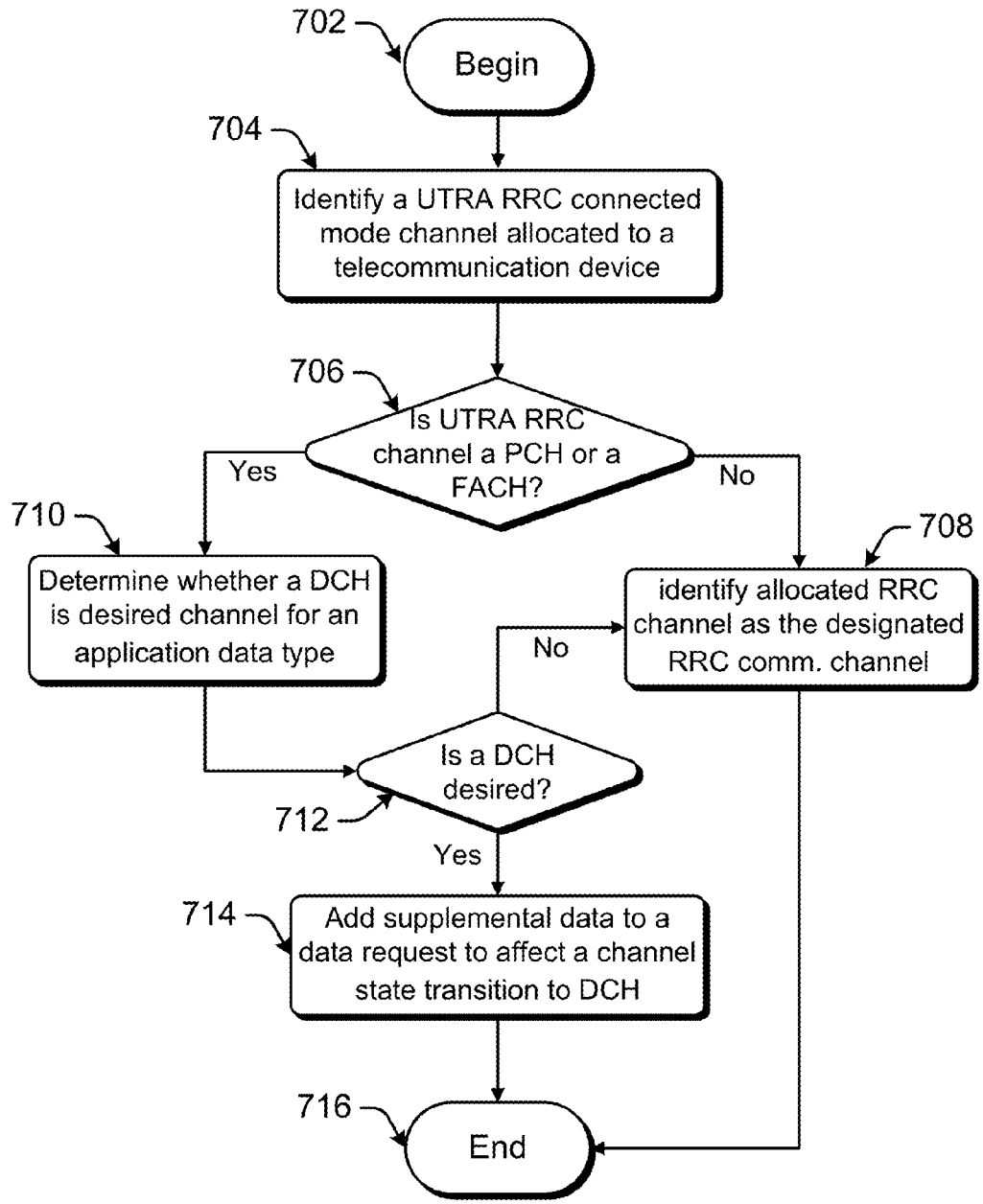
FIG. 7 is a flow chart of an example process for affecting an RRC transport channel transition between a pair of connected mode transport channels of the UTRA air interface, in accordance with embodiments of the disclosure.

FIG. 7 depicts flow diagram procedure 700 associated with processes for affecting an RRC channel state transition between connected mode transport channels of the UTRA air interface of UMTS, in accordance with various implementations. The procedure begins at block 702, which may occur in accordance with any of the above processes described above with respect to FIGS. 1-4. At block 704, a UMTS RRC connected mode channel, e.g., a PCH, FACH, or DCH, allocated to a particular telecommunications device is identified. Next, at decision block 706, a determination is made as to whether the RRC connected mode channel corresponds to either one of a PCH or FACH. If a determination is made that the RRC connected mode channel does not correspond to either a PCH or a FACH, the process proceeds to block 708, where the current, allocated RRC connected mode channel is identified as the designated communication channel for the telecommunication device. Subsequently, the process ends at block 716.

Alternatively, when a determination is made that the RRC connected mode channel does in fact correspond to either a PCH or a FACH, the process instead proceeds to block 710, where a determination is made as to whether a DCH should be the designated RRC connected mode channel for a particular application data type, e.g., based on a corresponding application data type sensitivity. Next, at decision block 712, a determination is made as to whether to allocate the DCH to the telecommunication device. If a determination is made not to allocate the DCH at decision block 712, then the process proceeds to block 708, where the current, allocated RRC connected mode channel is identified as the designated communication channel. Then, the process ends at block 716. Alternatively, when a determination is made to instead allocate the DCH at decision block 712, then the process proceeds to block 714, where supplemental data is added to the data request to affect an RRC channel state transition to Cell_DCH. Subsequently, the process ends at block 716.

It should be understood that although the present disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results, without departing from the spirit and scope of the invention, as claimed.

What is claimed is:

1. A telecommunication device comprising:
    a radio transceiver;
    one or more processors;
    a memory coupled to the one or more processors;
    a plurality of applications stored by the memory; and
    a network interface that is stored by the memory and is configured to be executed by the one or more processors to:
        detect an action at a network-driven application of the plurality of applications;
        determine whether the action initiates a data transfer request that corresponds to an application-specific rule that is related to a data-type sensitivity level of the network-driven application;
        identify a designated connected mode communication channel for a data transfer of the network-driven application to a network device in response to determining that the data transfer request corresponds to the application-specific rule; and
        add supplemental data to a corresponding data transfer request after identifying the designated connected mode communication channel,
        wherein the supplemental data includes dummy data or buffered data, and
        wherein the supplemental data is added to the corresponding data transfer request to affect a channel state transition from a current communication channel to the designated connected mode communication channel.

2. The telecommunication device of claim 1, wherein the data transfer of the network-driven application transfers application-specific content to the network device over a telecommunication network.

3. The telecommunication device of claim 1, wherein the network-driven application comprises one of a web-browser, a media content storefront application, and a data streaming application.

4. The telecommunication device of claim 1, wherein the supplemental data is added by padding the dummy data to the corresponding data transfer request or by piggybacking the buffered data to the corresponding data transfer request.

5. The telecommunication device of claim 1, wherein the designated connected mode communication channel is a transport channel comprising a forward access channel (FACH) or a dedicated channel (DCH).

6. The telecommunication device of claim 1, wherein the application-specific rule is based on a data-type sensitivity level of a network-driven media-streaming application.

7. A computer storage device with a stored computer-executable program, which when executed by one or more processors, performs acts, comprising:
    detecting a data request at a network-driven application of a telecommunication device;
    identifying a designated communication channel for a data transfer of the data request to a network device;
    adding supplemental data to the data request to affect a channel state transition to the designated communication channel, wherein the supplemental data includes dummy data or buffered data; and
    transferring data associated with the network-driven application to the network device using the designated communication channel.

8. The computer storage device of claim 7, wherein the data transfer of the network-driven application transfers application-specific content to the network device over a telecommunication network.

9. The computer storage device of claim 7, wherein the network-driven application comprises one of a web-browser, a media content storefront application, and a data streaming application.

10. The computer storage device of claim 7, wherein the supplemental data is added to the data request by padding the dummy data to the data request or by piggybacking the buffered data to the data request.

11. The computer storage device of claim 7, wherein the designated communication channel is a connected mode transport channel comprising a forward access channel (FACH) or a dedicated channel (DCH).

12. The computer-storage device of claim 7, wherein the act of identifying the designated communication channel includes determining whether the data request corresponds to an application-specific rule of the network-driven application.

13. The computer storage device of claim 12, wherein the application-specific rule is associated with a data-type sensitivity level of the network-driven application.

14. A method comprising:
    determining a designated transport channel allocated to a user device;
    transmitting, at the user device, supplemental data to a network service provider;
    detecting, at the user device, a transport channel state transition that occurs in response to the network service provider receiving a specific quantity of the supplemental data;
    determining, at the user device, the specific quantity of supplemental data causing the transport channel state transition; and
    setting, at the user device, a transport channel state transition threshold, based on the specific quantity of supplemental data causing the transport channel state transition.

15. The method of claim 14, wherein the designated transport channel is a radio resource control (RRC) connected mode channel associated with one of the Universal Terrestrial Radio Access (UTRA) air interface or the Evolved Universal Terrestrial Radio Access (E-UTRA) air interface.

16. The method of claim 14, wherein the supplemental data transmitted to the network service provider is dummy data, and wherein the transport channel state transition occurs in response to the service provider receiving a specific quantity of dummy data from the user device.

17. The method of claim 16, wherein the transport channel state transition threshold set at the user device is substantially equivalent to a corresponding transport channel state transition threshold set by the service provider.

18. A method comprising:
    detecting a data request at a network-driven application of a telecommunication device;
    identifying a designated communication channel for a data transfer of the data request to a network device;
    adding supplemental data to the data request to affect a channel state transition to the designated communication channel, wherein the supplemental data includes dummy data or buffered data; and transferring data associated with the network-driven application to the network device using the designated communication channel.

19. The method of claim 18, wherein the network-driven application comprises one of a web-browser, a media content storefront application, and a data streaming application.

20. The method of claim 18, wherein adding the supplemental data to the data request further comprises padding the dummy data to the data request or piggybacking the buffered data to the data request.

21. The method of claim 18, wherein the identified communication channel is a connected mode transport channel comprising a forward access channel (FACH) or a dedicated channel (DCH).

22. The method of claim 18, wherein identifying the designated communication channel further comprises:
   comparing the data request to at least one application-specific rule of the network-driven application to determine if a corresponding rule exists for the data request; and
   identifying the designated communication channel upon determining the corresponding rule to exist for the data request.

23. The method of claim 22, wherein the application-specific rule is based on data-type sensitivity level of a network-driven web browser application.

* * * * *